United States Patent

[11] 3,594,951

| [72] | Inventor | Leslie Perhacs, Jr.<br>Topanga, Calif. |
|---|---|---|
| [21] | Appl. No. | 818,667 |
| [22] | Filed | Apr. 23, 1969 |
| [45] | Patented | July 27, 1971 |
| [73] | Assignee | Cragstan Industries, Inc.<br>New York, N.Y. |

[54] WHEELED TOY TRACTOR WITH SEPARABLE MOTORIZED TRAILER MEANS
14 Claims, 5 Drawing Figs.

[52] U.S. Cl. .................................................. 46/244 A,
     46/202, 46/210
[51] Int. Cl. ................................................... A63h 17/05,
     A63h 30/00
[50] Field of Search ........................................... 46/201,
     202, 243, 244

[56] References Cited
UNITED STATES PATENTS

| 2,679,712 | 6/1954 | Schwien | 46/244 |
|---|---|---|---|
| 3,041,485 | 6/1962 | Jolley | 46/244 X |
| 3,337,985 | 8/1967 | Ryan et al. | 46/243 |
| 3,363,362 | 1/1968 | Jolley | 46/244 |

*Primary Examiner*—Antonio F. Guida
*Assistant Examiner*—Robert F. Cutting
*Attorney*—Burton L. Lilling ABSTRACT: Toy vehicle comprising tractor means having a cab, a chassis and a bed, said tractor means being constructed and arranged to enable said bed to be moved between elevated and nonelevated positions with respect to said chassis, and trailer means constructed and arranged to be operated by remote control, and moveable between a position in which it is separated from said tractor means, and a position in which it is disposed in cooperative association with respect to the bed thereof, and having a driving means for driving said tractor means when said trailer means is disposed in a cooperative position with respect to the bed thereof.

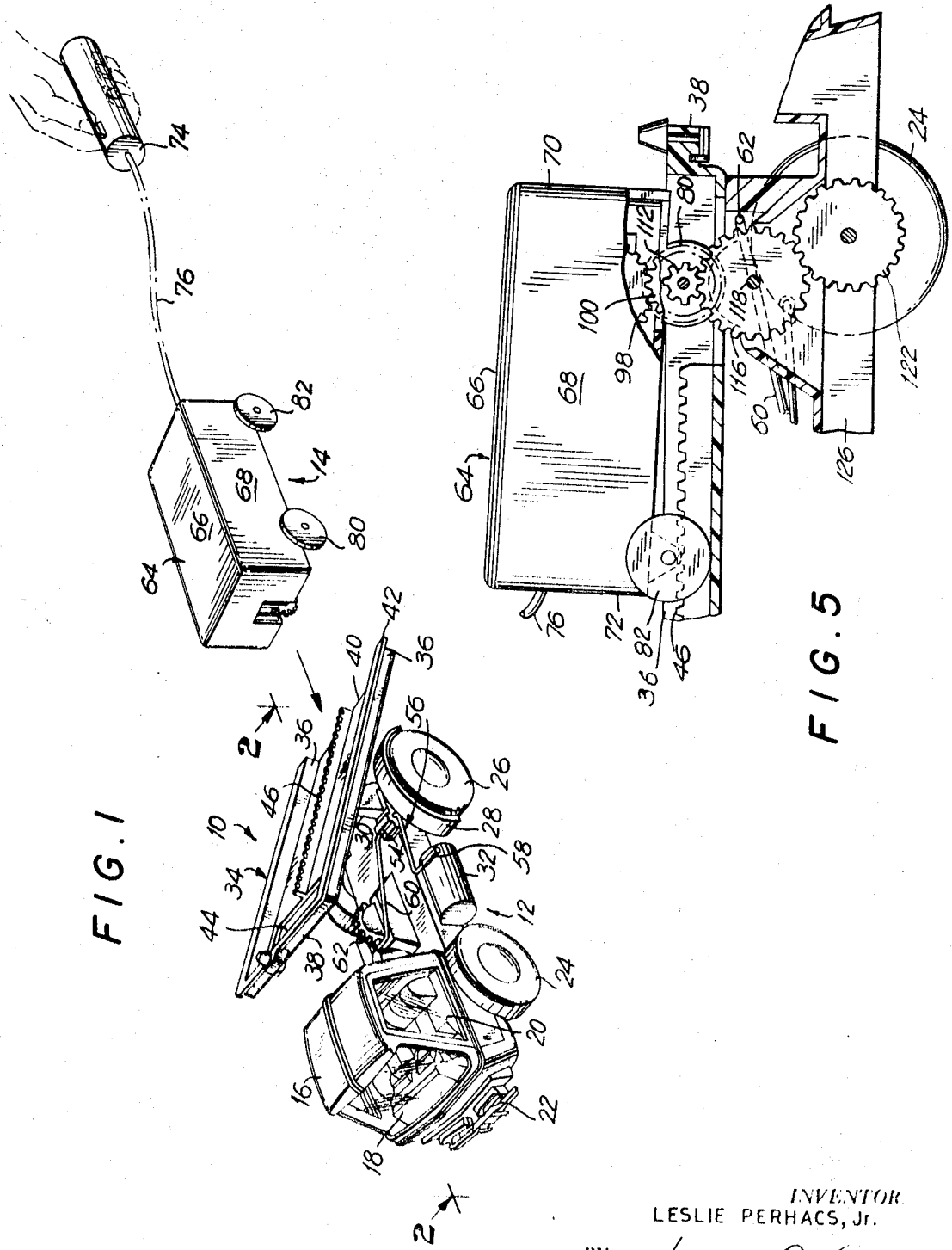

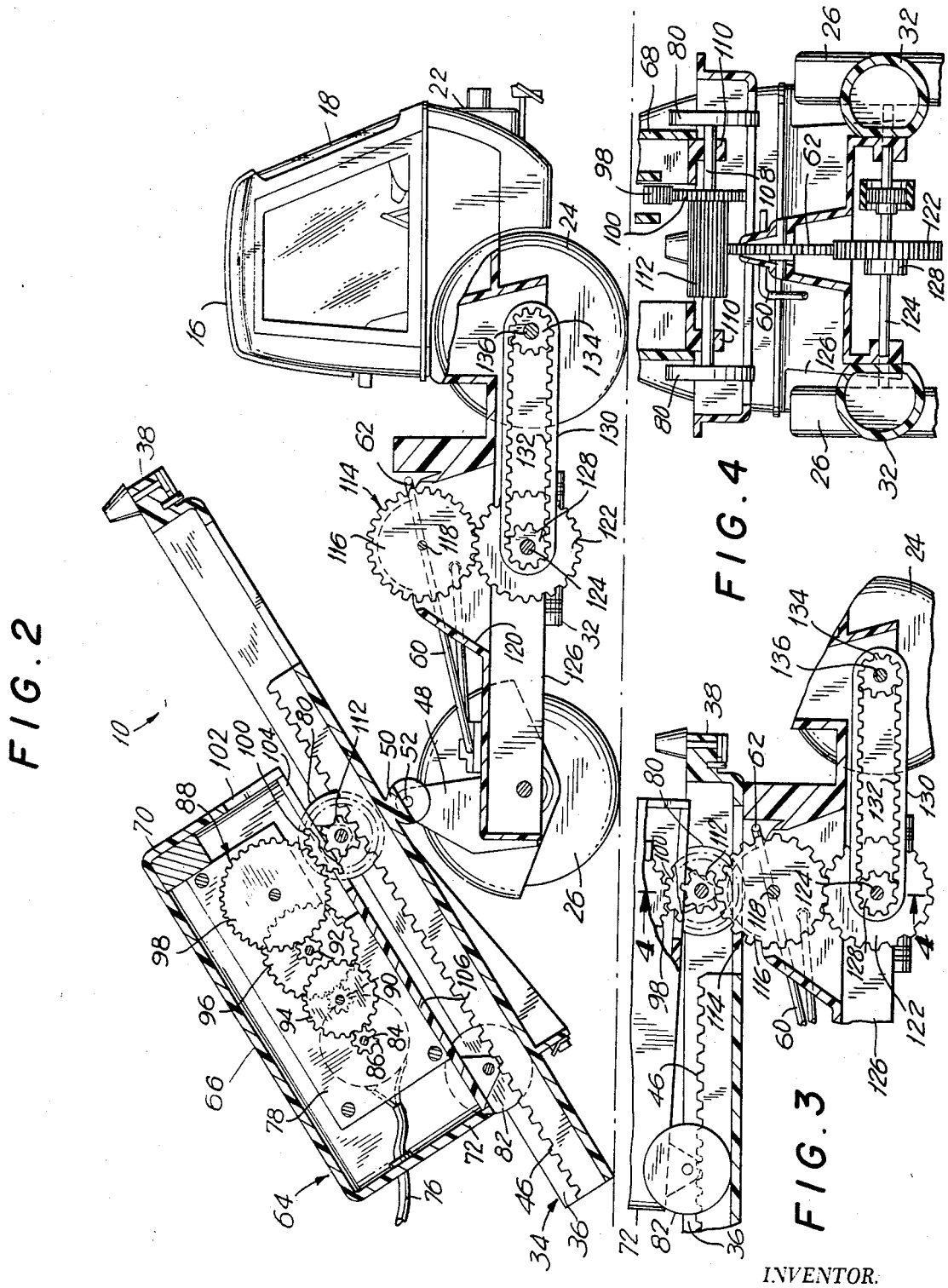

3,594,951

WHEELED TOY TRACTOR WITH SEPARABLE MOTORIZED TRAILER MEANS

SUMMARY

It is an object of the present invention to provide a toy vehicle constructed and arranged to present a unique degree of entertainment and amusement.

A further object of the present invention is to provide a vehicle comprising tractor and separable trailer means, said trailer means comprising a driving means for driving said tractor means when said trailer means is disposed in an operative relationship with respect to said tractor means.

Another object of the present invention, in addition to the foregoing objects, is to provide tractor means having an elevatable bed, and separable trailer means moveable between a position in which it is separated from said tractor means, and a position in which it is disposed in operative relationship with respect to the bed of said tractor means, said trailer means comprising driving means for driving said tractor means when said trailer means is disposed in a cooperative relationship with respect thereto.

Still further, it is an object of the present invention, in addition to the foregoing objects, to provide a vehicle comprising tractor means having an elevatable bed and separable trailer means constructed and arranged to be operated by remote control between a position in which it is separated from said tractor means, and a position in which it is disposed in a cooperative relationship with respect to the bed of said tractor means, said trailer means comprising driving means for driving said tractor means when it is disposed in a cooperative relationship with respect to the elevatable bed thereof.

Yet another object of the present invention, in addition to the foregoing objects, is to provide tractor means and, in a preferred form of the invention, a battery operated remotely controllable trailer means moveable between a position in which it is separated from said tractor means, and a position in which it is disposed in a cooperative relationship with respect thereto, said trailer means comprising driving means for driving said tractor means when said trailer means is disposed in said cooperative relationship with respect thereto.

Other objects of the present invention will become apparent upon reading the following specification and referring to the accompanying drawings, which form a material part of this disclosure.

BRIEF DESCRIPTION OF THE DRAWINGS

FIG. 1 is a blown-up bisometric view of a vehicle constructed in accordance with the principals of the present invention;

FIG. 2 is a side elevational view of the vehicle illustrated in FIG. 1, in cross section showing one embodiment of an assembly for transmitting a forward motion to the tractor means of said vehicle;

FIG. 3 is a partial cross-sectional view, in elevation, of the vehicle illustrated in FIG. 1, showing the driving means of the trailer in cooperative association with the assembly for transmitting a forward motion to the tractor means;

FIG. 4 is a front elevational view, in cross section, of the vehicle illustrated in FIG. 3; and FIG. 5 is a partial cross-sectional view, similar to FIG. 3, but illustrating a modification of the assembly for transmitting forward motion to the tractor means of a vehicle constructed in accordance with the principals of the present invention.

DESCRIPTION OF THE PREFERRED EMBODIMENTS

With reference now to FIG. 1, there is illustrated therein a vehicle constructed in accordance with the principals of the present invention, and generally designated by the reference character 10. At the outset, it will be understood that a vehicle constructed in accordance with the principals of the present invention is not limited to a toy vehicle and, therefore, the ensuing description and appended claims are to be construed and interpreted in the broadest possible manner.

The vehicle 10 comprises tractor means generally designated by the reference character 12, and trailer means generally designated by the reference character 14. The tractor means 12 comprises a cab 16 having an instrument panel or operating control 18, comprising a conventional steering wheel and column (not shown), a seat assembly 20, a fender 22, and a front wheel assembly 24, and a rear wheel assembly 26. The rear wheel assembly 26 comprises fender means 28 which may be constructed of any suitable and conventional material, and in any suitable and conventional manner.

The tractor means 12 further comprises a chassis 30 operatively disposed with respect to the cab 16 having a plurality of tanks or containers 32 mounted thereupon. The chassis 30 may be operatively disposed with respect to the cab 16 in any suitable and conventional manner and the tanks or containers 32 may be fabricated of any suitable and conventional material, mounted upon the chassis in any suitable and conventional manner. The present invention, in exemplary form illustrated, is a toy vehicle, and, therefore, such a suitable and conventional material may be plastic, as is illustrated.

The tractor means 12 comprises, further, a bed 34 constructed and arranged to be moved between positions in which it is elevated with respect to the chassis 30, as is shown in FIGS. 1 and 2, and a nonelevated position with respect thereto, such as is shown in the remainder of the figures. For purposes of this description, and the appended claims, the various positions of the bed 34 may sometimes be referred to as elevated and nonelevated positions, and at other times may be referred to as raised or lowered positions with respect to the chassis 30. The bed 34 comprises a plurality of sidewalls 36 and a front or end wall 38, with the other end of the bed 40 being open and unobstructed. A peripheral lip or ledge 42 extends around the bed 34 along the sidewalls 36 and the front wall 38. The bed 34 comprises, further, a recess 44 disposed forwardly or frontally thereof, the recess 44 preferably being of generally rectangular configuration. In the preferred form of the invention illustrated, the bed 34 comprises, still further, a rack 46 positioned thereupon, generally centrally thereof, and extending from the open and unobstructed end 40 of the bed towards the front wall 38 thereof, terminating at the recess 44.

In order to dispose the bed 34 in operative relationship with respect to the chassis 30, the latter comprises, further, a standard or bracket 48 fixedly or integrally mounted with respect thereto, and the bed 34, on the under surface thereof, as is clearly shown in FIG. 2, comprises a pivot 50 particularly adapted to be rotatably mounted with respect to the standard 48. To that end, the latter comprises a pivot pin 52 extending therethrough. In order to retain the bed 34 in a raised or elevated position with respect to the chassis 30, the latter also comprises a journal bearing 54 fixedly mounted thereupon or integrally disposed with respect thereto, through which there extends a portion of an assembly for retaining the bed 34 in a raised or elevated position, generally designated by the reference character 56. The assembly 56 comprises a handle 58 and a generally U-shaped member having a plurality of legs 60 and a bight portion 62.

With continued reference now to FIGS. 1 and 2, the trailer means 14 comprises a housing generally designated by the reference character 64 having a top wall 66, a plurality of sidewalls 68, a front wall 70 and a rear wall 72. It is to be remembered that in the exemplary form of the present invention described, disclosed, shown, illustrated and claimed in this application, it takes the form of a toy vehicle, and, therefore, the housing 64 of the trailer means 14 may be fabricated of any suitable and conventional material, as plastic. The trailer means 14 is constructed and arranged to be operated by remote control, and, to that end, there is provided a controller 74 which may be of any suitable and conventional construction, and, as will be considered obvious to one ordinarily skilled in the art to which this invention pertains, comprises a source of energy (not shown) such as one having a plurality of batteries, and a suitable electrical circuit. A conductor 76 extends from the controller 74 to a motor 78, which may also be of any suitable and conventional construction, disposed within the housing 64 of the trailer means 14.

The trailer means 14 further comprises a plurality of front wheels 80 and a plurality of rear wheels 82, and, as is now considered readily obvious to one skilled in the art to which this invention pertains, the trailer means 14 is particularly constructed and arranged to be moved between a position in which it is completely separate from the tractor means 12, as is shown in FIG. 1, and a position in which it is cooperatively engaged with the bed 34 of the tractor means 12, as is shown in any of the remaining figures of the drawings.

The motor 78 of the trailer means 14 comprises a motor shaft 84 (FIG. 2) extending laterally outwardly therefrom on which there is rotatably fixedly mounted a pinion 86. The trailer means 14 comprises, still further, driving means generally designated by the reference character 88 with respect to which the pinion 86 mounted upon the motor shaft 84 is adapted to be disposed in operative engagement. The driving means 88 comprises, preferably, a gear train comprising a plurality of pinions 90 and 92 and a plurality of gears or gear wheels 94, 96 and 98. The gear or gear wheel 98 may be denoted as a driving gear, and is adapted to be disposed in an operative relationship with respect to a driven gear or driven gear wheel 100 that can be seen through a recess 102 (see FIG. 2) in the front wall 70 of the housing 64 and is adapted to extend through a recess 104 in a bottom wall 106 thereof. The driven gear or driven gear wheel 100 is nonrotatably mounted upon a shaft 108 extending transversely of the housing 64. This shaft 108 extends through bearings 110 fixedly mounted with respect to the sidewalls 68 of the housing and extending downwardly therefrom. The front wheels 80 of the trailer means 14 are nonrotatably mounted upon and with respect to the shaft 108, so that it will now be understood by anyone skilled in the art to which this invention pertains that the front wheels 80 will be rotated in such a direction as to cause forward movement of the tractor means 14 by the driven gear or gear wheel 100 of the driving means 88.

The driving means 88 further comprises a driven pinion gear 112 that is also nonrotatably mounted upon and with respect to the shaft 108, is of generally cylindrical configuration, and is of a substantial width in order to insure, as will be described in greater detail hereinafter, the engagement of the driven gear 112 with the rack 46 of the bed 34.

With continued reference to FIG. 2 of the drawings, and returning now to the tractor means 12, the tractor further comprises an assembly for transmitting forward and reverse motion to the front wheels 24 thereof, generally designated by the reference character 114. The assembly 114 comprises a driving gear 116 nonrotatably mounted upon a shaft 118 that is rotatably mounted within an integral housing 120 extending upwardly from chassis 30 of the tractor means 12. The driving gear 116 is adapted to be disposed in toothed engagement with a driven gear or driven gear wheel 122 that is nonrotatably mounted upon another shaft 124 that extends between and is rotatably mounted with respect to the sidewalls 126 of the chassis 30. A pinion 128 is also nonrotatably mounted upon and with respect to the shaft 124 and is adapted to be disposed in toothed engagement with an endless belt 130 having internal gear teeth 132. The belt 130 is adapted to cooperate with a driving pinion 134 that is nonrotatably mounted upon and with respect to another shaft 136 that also extends between and is rotatably journaled within the sidewalls 126 of the chassis 30.

The operation of the toy vehicle 10 is shown and illustrated in FIGS. 1—4 and should now be considered readily apparent to one skilled in the art to which the invention pertains. In FIG. 1, the tractor 12 and trailer 14 means are shown separated with respect to one another. The user raises the bed 34 to the elevated position illustrated in FIG. 1, and in order to retain the bed in that position the assembly 56 can be rotated from its position as shown in that figure through the medium of the handle 58 until the bight 62 is disposed in a retaining position against the undersurface of the bed. At this point, it is to be noted that when the assembly 56 is not in use, it is rotated through the medium of the handle 58 to the position illustrated in FIGS. 1 and 2, in which position the bight 62 rests upon the housing 120 that extends upwardly from the chassis 30.

The user now operates the controller 74 in a conventional manner, thus causing the pinion 86 to drive the drive means 88 in a forward direction. At this point, it is noted that the controller 74 preferably is constructed and arranged to provide forward and reverse movement of the trailer means 14, and to that end, the motor 78 may be of conventional reversible construction. As the drive means 88 is driven by the pinion 86, the driving gear or gear wheel 98 will drive the driven gear or gear wheel 100 which, in turn, will drive the shaft 108 and thus the forward wheels 80 of the trailer means 14.

As the trailer means 14 moves forward towards the tractor means 12, the trailer means will enter upon the bed 34 of the tractor means through the open and unobstructed end 40 thereof. Because the driving pinion 112 is of generally cylindrical configuration and of substantial width, as is clearly shown and illustrated in FIG. 4, engagement with the rack 46 on the bed 34 is insured. Once the rack 46 and the pinion 112 are engaged, the trailer means 14 will continue forwardly of the bed 34 until the pinion 112 disengages the rack 46, and "falls" through the recess 44 located frontally of the bed 34.

At this point, the user disengages the assembly for retaining the bed 34 in an elevated position, rotating it through the medium of the handle 56 to its disengaged position as clearly illustrated in FIGS. 1 and 2. The bed 34 can now be lowered to its nonelevated position, such is shown in any of the figures other than FIGS. 1 and 2, in which position the driving pinion 112 will engage the driving gear or gear wheel 116 of the assembly 114 for transmitting forward motion to the tractor means 12.

It is now considered readily apparent that once the driving pinion 112 of the driving means 88 is disposed in engagement with the driving gear 116 of the assembly 114, continued operation of the controller 74 will now cause forward motion of the combination of the tractor 12 and trailer 14 means. At this point, it is noted that when the trailer means 14 is disposed in operative association with the tractor means 12 the forward wheels 80 of the trailer means 14 are disengaged.

It was hereinabove pointed out that the controller 74 preferably is constructed and arranged to provide for both forward and reverse movements. To that end, as was also hereinabove pointed out, the motor 78 preferably is a reversible one. Accordingly, as is now also considered readily apparent to those skilled in the art, the user can enjoy forward and reversible movement of the toy vehicle 10 when the trailer means 14 is disposed in operative association with the tractor means 12. To separate the trailer means 14 from the tractor means 12, it is only necessary for the user to slightly lift the trailer means and disengage the driving means 88 from the assembly 114. If the user will then move the trailer means only slightly rearwardly to cause engagement once again by and between the pinion 112 and the rack 46, continued operation of the controller 74 in a reverse direction will cause the trailer means 14 to back off of the bed 34 of the tractor means 12. Of course, it is desirable in order to accomplish this that the user elevate the bed 34 through the medium of the assembly 56 in the manner hereinbefore described.

With reference now to FIG. 5 of the drawings, wherein like reference numerals indicate like parts, but wherein the reference numerals are primed, there is illustrated therein a modification of the assembly for transmitting forward movement or motion to the tractor means 12, and generally designated by the reference character 114'. In this modification, the shaft 124' on which the driven gear or gear wheel 122' is nonrotatably mounted is disposed forwardly of the shaft 118' on which the driving gear or gear wheel 116' is nonrotatably mounted. And, the shaft 124' in this embodiment or modification extends transversely of the chassis 30 of the vehicle, and the front wheels 24' of the vehicle 10' are nonrotatably mounted thereupon in any suitable and conventional manner. In all other respects, the modification illustrated in FIG. 5 is substantially the same, and the toy vehicle of this embodiment or modification is operable in the same manner.

From the foregoing, it is seen that the present invention provides a toy vehicle which fully accomplishes its intended objects and is well adapted to meet practical conditions of manufacture, installation, maintenance and use.

Although the present invention has been described in some detail by way of illustration and example for purposes of clarity of understanding, it is understood that certain changes and modifications may be made within the spirit of the invention and scope of the appended claims.

I claim:

1. In combination, tractor means having a wheel assembly and an assembly for transmitting forward and reverse movement thereto, and trailer means separable from said tractor means and having a position in which it is disposed in operative association with said tractor means, said trailer means comprising driving means adapted to be disposed in operative association with the assembly of said tractor means for transmitting forward and reverse movement to the wheel assembly thereof, the driving means of said trailer means is constructed and arranged to drive said trailer means in forward and reverse directions when the trailer means is disposed separately with respect to said tractor means, and wherein said tractor means comprises chassis means and bed means constructed and arranged to be elevatable between raised and lowered positions with respect thereto, said trailer means being capable of being moved on said bed means when said bed means is in an elevated position with respect to said chassis means, and the driving means of said trailer means in operative association with the motion transmitting assembly of said tractor means when the bed means is disposed in a lowered position with respect to said chassis.

2. In combination, tractor means, having chassis means and bed means constructed and arranged to be elevated between raised and lowered positions with respect thereto, and having a wheel assembly and an assembly for transmitting forward and reverse movement thereto, and trailer means separable from said tractor means and having a position in which it is disposed in operative association with said tractor means, said trailer means comprising driving means adapted to be disposed in operative association with the assembly of said tractor means for transmitting forward and reverse movement to the wheel assembly thereof, said bed means comprising an aperture extending therethrough into which said motion transmitting assembly of the tractor means is adapted to extend when said bed means is disposed in a lowered position with respect to said chassis means, and wherein said trailer means comprises at least one wheel assembly, said driving means being constructed and arranged to drive the wheel assembly of said trailer means in forward and reverse directions, and wherein the wheel assembly of said trailer means is adapted to extend through the aperture of said bed means when the trailer means is disposed in operative association with the tractor means enabling said driving means and said motion transmitting assembly to be disposed in operative association with respect to one another, further enabling said trailer means to drive said tractor means in forward and reverse directions.

3. In combination as defined in claim 2, wherein said bed means comprises a rack disposed thereupon, and the driving means of said trailer means comprises a pinion of substantial width enabling positive engagement between said pinion and said rack, further enabling said trailer means to be driven into its position of operative association with said tractor means.

4. In the combination as defined in claim 3, wherein said tractor means comprises a reversible motor, and said driving means comprises a gear train operable by said motor to drive said pinion.

5. In the combination as provided in claim 3, wherein said chassis means comprises a housing, and wherein said motion transmitting assembly comprises a driving gear rotatably mounted in said housing and adapted to be disposed in engagement with the pinion of the driving means of said trailer means when the latter is disposed in operative association with respect to said trailer means, a driven gear disposed in operative engagement with said driving gear, said driven gear being nonrotatably mounted upon a shaft rotatably mounted with respect to said chassis means, and an endless belt arrangement extending between said shaft and the wheel assembly of said tractor means.

6. In the combination as provided in claim 3, wherein said chassis means comprises a housing, and wherein said motion transmitting assembly comprises a driving gear rotatably mounted and extending through said housing enabling the pinion of said driving means of the trailer means to be disposed in operative engagement therewith, a driven gear adapted to be disposed in operative engagement with said driving gear and being nonrotatably mounted upon a shaft that, in turn, is nonrotatably operatively associated with the wheel assembly of said tractor means.

7. A toy vehicle comprising, in combination, tractor means comprising a wheel assembly and an assembly for transmitting forward and reverse movement with respect thereto, and trailer means adapted to be disposed in operative association with said tractor means, and having driving means particularly adapted to be disposed in operative engagement with said motion transmitting assembly when said trailer means is disposed in operative association with respect to said tractor means; said tractor means comprising a chassis and a bed constructed and arranged to be elevatable between raised and lowered positions with respect thereto, said bed means being constructed and arranged to enable said transmitting assembly to extend at least partially therethrough when said bed means is disposed in a lowered position with respect to said chassis means, and wherein the driving means of said trailer means is constructed and arranged to impart forward and reverse movement with respect thereto, and wherein the driving means of said trailer means is adapted to be disposed in operative engagement with said motion transmitting assembly when the trailer means is disposed in operative association with respect to said tractor means.

8. A toy vehicle as defined in claim 7, wherein said tractor means comprises a chassis means having a housing through which said motion transmitting assembly is adapted to extend, and bed means constructed and arranged to be elevatable between raised and lowered positions with respect to said chassis means, said bed means having an aperture through which said motion transmitting assembly is adapted to at least partially extend when said bed means is disposed in a lowered position with respect to said chassis means, and a rack extending longitudinally thereof, and wherein the driving means of said trailer means comprises a pinion adapted to be disposed in operative engagement with the rack of said bed means enabling said trailer means to be moved into operative association with respect to said tractor means, the rack of said driving means being adapted to be disposed in operative engagement with said motion transmitting assembly when said trailer means is disposed in operative engagement with respect to said tractor means and the bed means thereof is disposed in a lowered position with respect to said chassis means, further enabling the driving means of said trailer means to drive said tractor means in forward and reverse directions.

9. A toy vehicle as defined in claim 8, wherein the pinion of said driving means is of substantial width to insure positive operative engagement with the pinion of said bed means.

10. A toy vehicle as defined in claim 9, wherein said trailer means comprises a reversible motor, and wherein said driving means further comprises a gear train particularly adapted to be operated in forward and reverse directions by said motor.

11. A toy vehicle as defined in claim 10, wherein said trailer means comprises a wheel assembly, the pinion of said driving means being nonrotatably operatively associated with said wheel assembly to drive said wheel assembly in forward and reverse directions, and wherein said wheel assembly of the trailer means is adapted to extend through the aperture in said bed means when the trailer means is disposed in operative association with respect to said tractor means.

12. A toy vehicle as defined in claim 11, wherein said motion transmitting assembly comprises a driving gear adapted to be disposed in operative engagement with the pinion of the driving means of said trailer means, a driven gear adapted to be driven by said driving gear, and an endless belt assembly for transmitting forward and reverse directional movement from said driven gear to the wheel assembly of said tractor means.

13. A toy vehicle as defined in claim 11, wherein said motion transmitting assembly comprises a driving gear adapted to be disposed in operative engagement with the pinion of the driving means of said trailer means, and a driven gear adapted to be disposed in operative engagement with said driving gear, and being disposed in nonrotatable operative engagement with the wheel assembly of said tractor means to transmit forward and reverse directional movement from the driving gear thereto.

14. A toy vehicle as defined in claim 7, wherein said trailer means is constructed and arranged to be operated by remote control, and comprises a remote controller having a source of electrical energy.